United States Patent

Mann

[15] 3,638,191
[45] Jan. 25, 1972

[54] PRODUCTION MONITORING SYSTEM

[72] Inventor: Charles G. Mann, Farmington, Mich.
[73] Assignee: Weltronic Company, Southfield, Mich.
[22] Filed: Jan. 8, 1968
[21] Appl. No.: 696,462

[52] U.S. Cl. ...........................340/163, 340/413, 340/147 R
[51] Int. Cl. ..........................................................H04q 5/00
[58] Field of Search .....................340/163, 147, 413; 235/92

[56] References Cited

UNITED STATES PATENTS

| | | | |
|---|---|---|---|
| 3,344,408 | 9/1967 | Singer et al. | 235/92 |
| 2,985,368 | 5/1961 | Kohler et al. | 340/163 X |
| 3,091,756 | 5/1963 | Lowman | 340/413 UX |
| 3,435,416 | 3/1969 | Kretsch et al. | 340/163 |

*Primary Examiner*—John W. Caldwell
*Assistant Examiner*—Michael Slobasky
*Attorney*—Wilson & Fraser

[57] ABSTRACT

A system providing an interface between work stations in a manufacturing plant and a central station which may include signals to supervisory personnel, and means to apply signals to a supervisory computer. The computer is arranged to regularly monitor a restricted scope of production criteria and in response to any change indicating a significant alteration in plant operation, to review a broadened scope of production criteria and information. Work stations are broken down into groups and groups into lines such that computer time is efficiently utilized by reviewing in detail only the work stations of a group in which a significant change has occurred. Indicators at the central station are oriented to reflect conditions on a line of work stations and include the feature of treating the line as "down" when any station in the line is "down," even though the remaining stations may be in a "run" status.

19 Claims, 8 Drawing Figures

INVENTOR.
CHARLES G. MANN
BY
Wilson & Fraser

COUNT   THRESHOLD   CODE

INVENTOR
CHARLES G. MANN

BY
Wilson + Fraser

PRODUCTION MONITORING SYSTEM

This invention relates to production monitoring systems and more particularly to a system which monitors production at a plurality of work stations by utilizing significant information for said work stations as the basis for developing data in a supervisory computer and indications to supervisory personnel to facilitate the operation of a manufacturing plant including, the scheduling of production, the maintenance and repair of equipment, the generation of inventory and payroll information, and the issuance of instructions for situations which may develop and are preprogramed into the computer.

As manufacturing operations have become more automated, it has become desirable to more closely oversee these operations. Well run plants must be coordinated in their various manufacturing functions to obtain a proper relationship of elements which make up the ultimate product. In order to achieve these objectives, the periods of productivity and idleness, the reasons for such idleness at the various work stations throughout the manufacturing plant, the rate of production, the proportioning of production, and payroll information, should be communicated to management.

One object of the present invention is to present information from a work station in a form which can be utilized both for indicators to supervisory personnel, and for a supervisory computer.

Another object is to efficiently utilize computer time in a production monitoring system by supplying a restricted scope of information to the computer on a regular basis from the work stations being monitored, and in response to a significant change from a production standpoint in conditions for the work station causing the computer to consider a broader scope of production information from the work station.

Another object is to increase the efficiency of utilization of computer time in a production monitoring system involving large numbers of monitored work stations by grouping the work stations in a plurality of groups whereby the consideration of a broad range of production information in accordance with the next preceding object is restricted to the stations of the group in which the significant change has occurred.

Another object of this invention is to orient the monitoring functions in accordance with a line orientation of the work stations whereby the complementary functions of the work stations are interrelated in the production monitoring functions by the operation of indicator to supervisory personnel, and the response of the supervisory computing equipment.

Another object is to coordinate the production monitoring operation for work stations which complement each other, whereby the performance at one work station is appropriately reflected in the monitoring of its associated work stations.

A further object is to expand the supervisory capacity of an individual responsible for a plurality of work stations.

A further object is to enhance the transmission of information between a work station and a central station and between a work station and information utilizing equipment such as a computer for production monitoring purposes.

Another object is to maximize the utilization of indicators for production monitoring purposes by operating the indicators in different modes to signify a plurality of different conditions.

In accordance with the above objects, one feature of this invention resides in a production monitoring system wherein production information is accumulated for individual work stations in the information storage sections of a computer as directly derived by scanning each of the work stations of the system on a regular basis. In order to insure an accurate reading into the computer storage, without the need for intermediate storage or delay devices, the operation of the sensing devices at the work station, the scanning frequency, and the computer response must be correlated. For example, where the count of a productive function at the work station is the productive information being accumulated, the computer storage is arranged to respond to a count only if it is indicated in two successive scans of the work station. Thus, the count indicating device must remain closed for the interval of two scans of the scanning device to provide two spaced impulses to the computer. In this manner, a false count, due to spurious signals, is avoided.

Another feature resides in arranging the computer to assimilate a broader scope of production information concerning individual work stations when a significant production change occurs at a work station. Advantageously, this feature is arranged to consider a group or block of work stations which is less than the entire number of work stations in the production monitoring system to efficiently utilize computer time and consider the broad scope of information for only a limited number of stations where the production change is significant. Production changes which institute this operation include a transfer of production status for a work station, and an indication of a need for help from a work station.

Another feature resides in monitoring the work stations in a line orientation corresponding to their production line orientation. Where complementary production operations are performed in a number of stations in a line, and one such station is transferred to a "down" status, the monitoring system treats the entire line as being on a "down" status. Thus, even stations which are assigned a "run" production status where indicators are employed at the work stations indicate a "down" status, and the common indicator at the central station for the line indicates that the line is on "down" status. It may be desirable to set a work station in operation while other work stations of its production line are "off." Under these circumstances the monitoring system is arranged to disregard the stations in "off" status insofar as assigning a status to the line is concerned. Thus, the individual work stations set for "run" status and the common indicators all indicate a "run" status when one or more stations of a line are set for the "run" status, and no station is set for the "down" status.

Another feature involves a "help call" annunciator display including a plurality of individual annunciators representing frequently utilized calls for the work stations, arranged as common to a line of work stations. The annunciators which individually may be lamps, as initially set by a "help call" transmitter switch at each of a plurality of the work stations, are illuminated at a varying degree of brilliance to alert the central station attendant to an unacknowledged "help call." Once the attendant acknowledges the "help call," he can cancel the flickering illumination by a reset means which thereafter maintains the annunciator illuminated at a constant level until the call device at the work station is reset. Further, the attendant at the work station is alerted to the fact that he has a "help call" in registration by a characteristic alarm which may be a flickering lamp located in a control box at the work station.

Another feature involves a "threshold" signal generated by the computer to actuate the line annunciator. Each of a plurality of work stations of a line can be programmed to cause the issuance of a "threshold" signal as where the rate of production operations sensed by the computer falls outside of an acceptable range, where the number of operations is such as to indicate tool life to dictate a change in tooling, or where production at the various stations in the plant is not in balance with the production at the particular station. Upon issuance of a "threshold" signal, the annunciator is actuated to call the attention of the central station attendant to a situation requiring his consideration. The central station attendant can acknowledge the "threshold" signal by operating the reset means.

A further feature of the annunciator system involves provision for duplication of like calls from two stations of a production line. Under these circumstances, the operation of the acknowledged annunciator is not interrupted, but an auxiliary alarm is operated to indicate to the central station attendant that duplicate calls are in registration. This auxiliary alarm can be reset upon acknowledgement of the call by the attendant.

The above and additional objects and features of the invention will be more fully appreciated from the following detailed description when read with reference to the accompanying drawings, in which.

Figure 2:
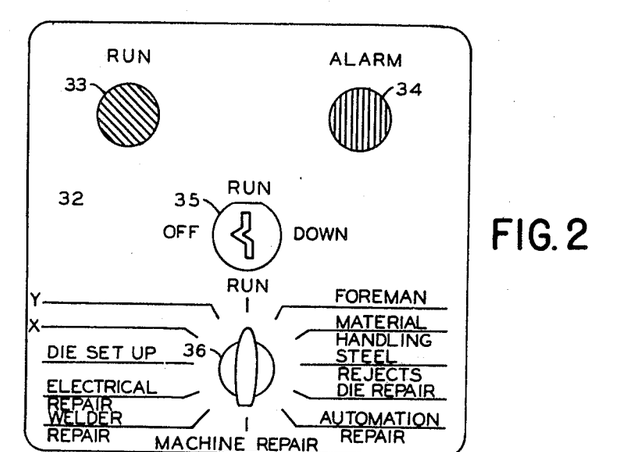
FIG. 2 represents the faceplate of a control box for a typical work station.
Figure 5:
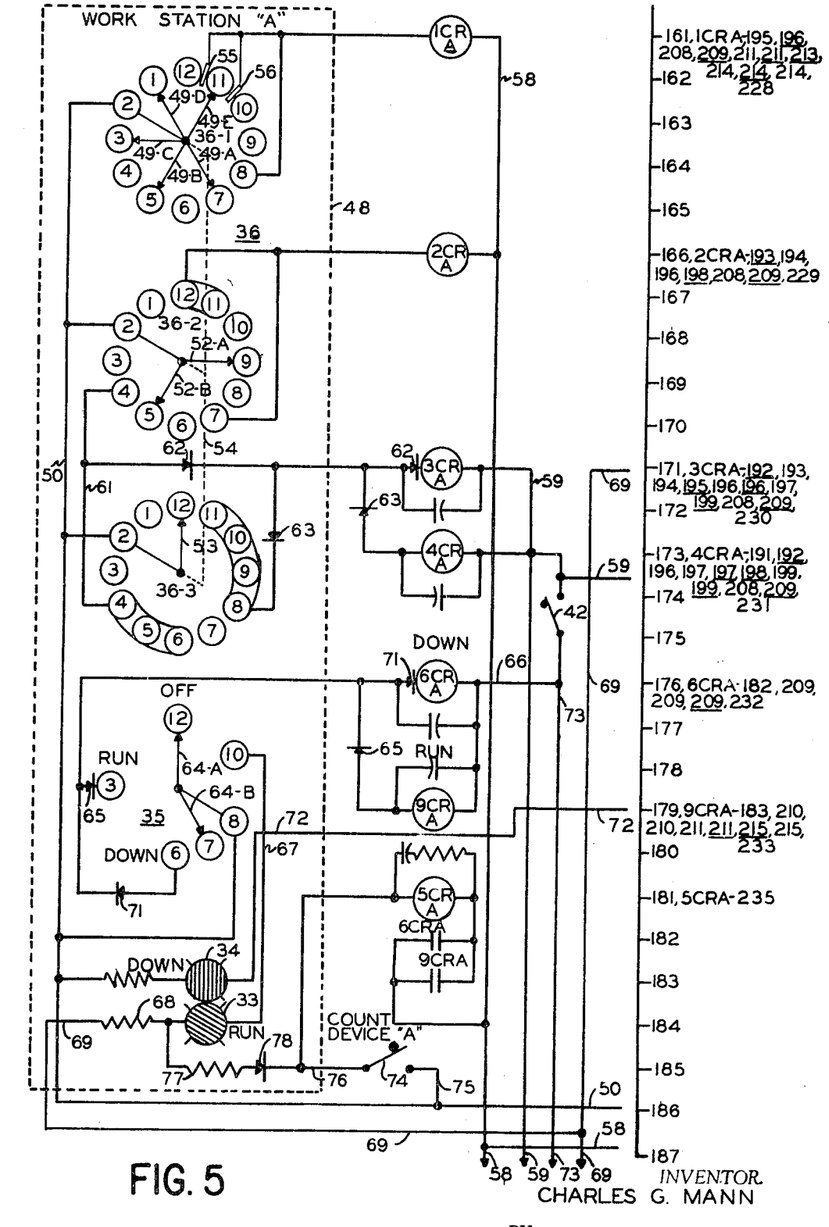
FIGS. 5, 6 and 7 are across-the-line diagrams of the circuits including those circuits of the control box at a typical machine, the circuits responsive to the control box operation for a work station, central station elements for two typical work stations, and the common equipment of a line, and the output terminals to a computer for supervising the system, all arranged in a manner such that the diagrams can be aligned in accordance with the orientation diagramed in FIG. 8 to present a unitary circuit.
Figure 6:
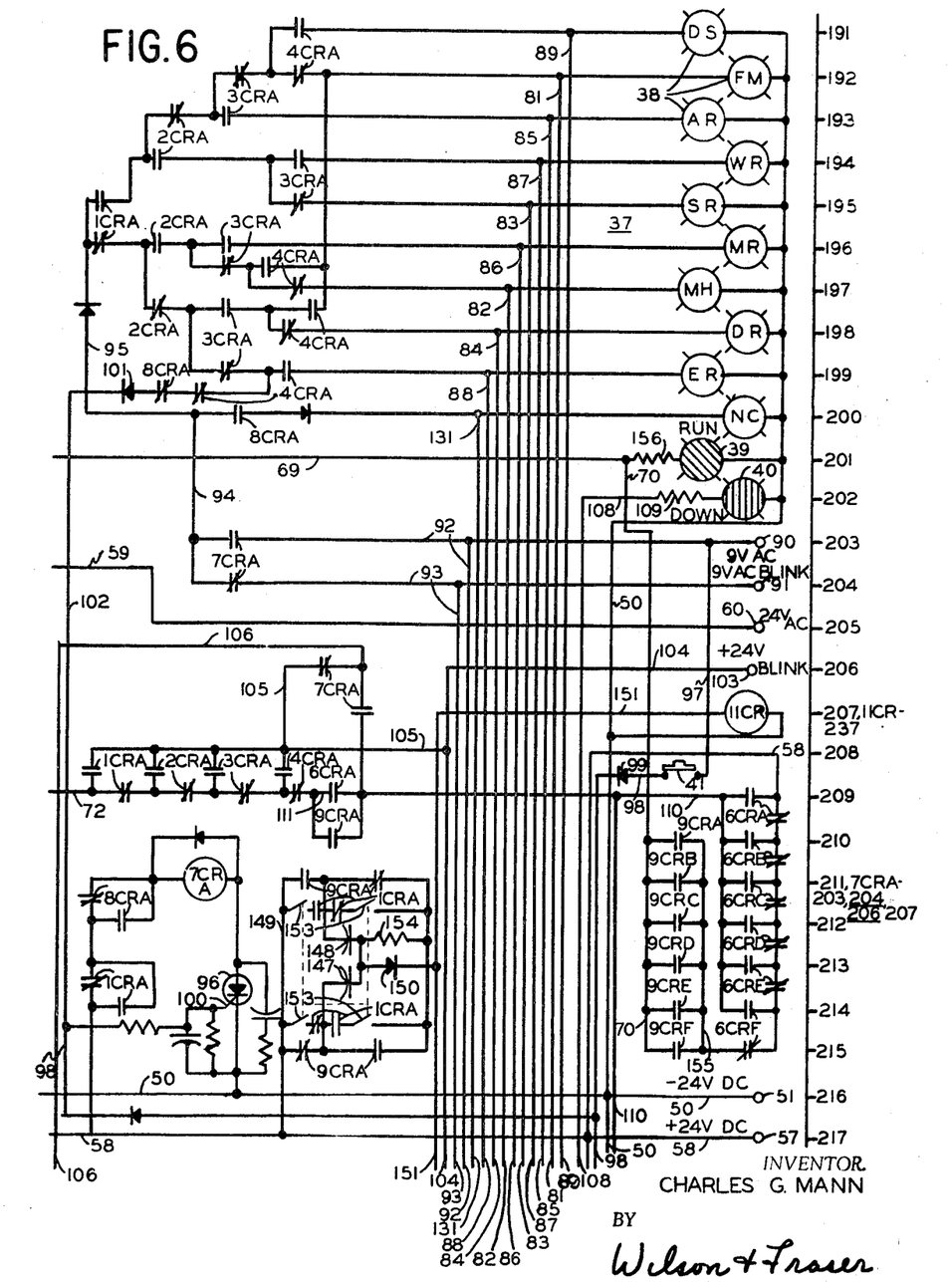
Figure 7:
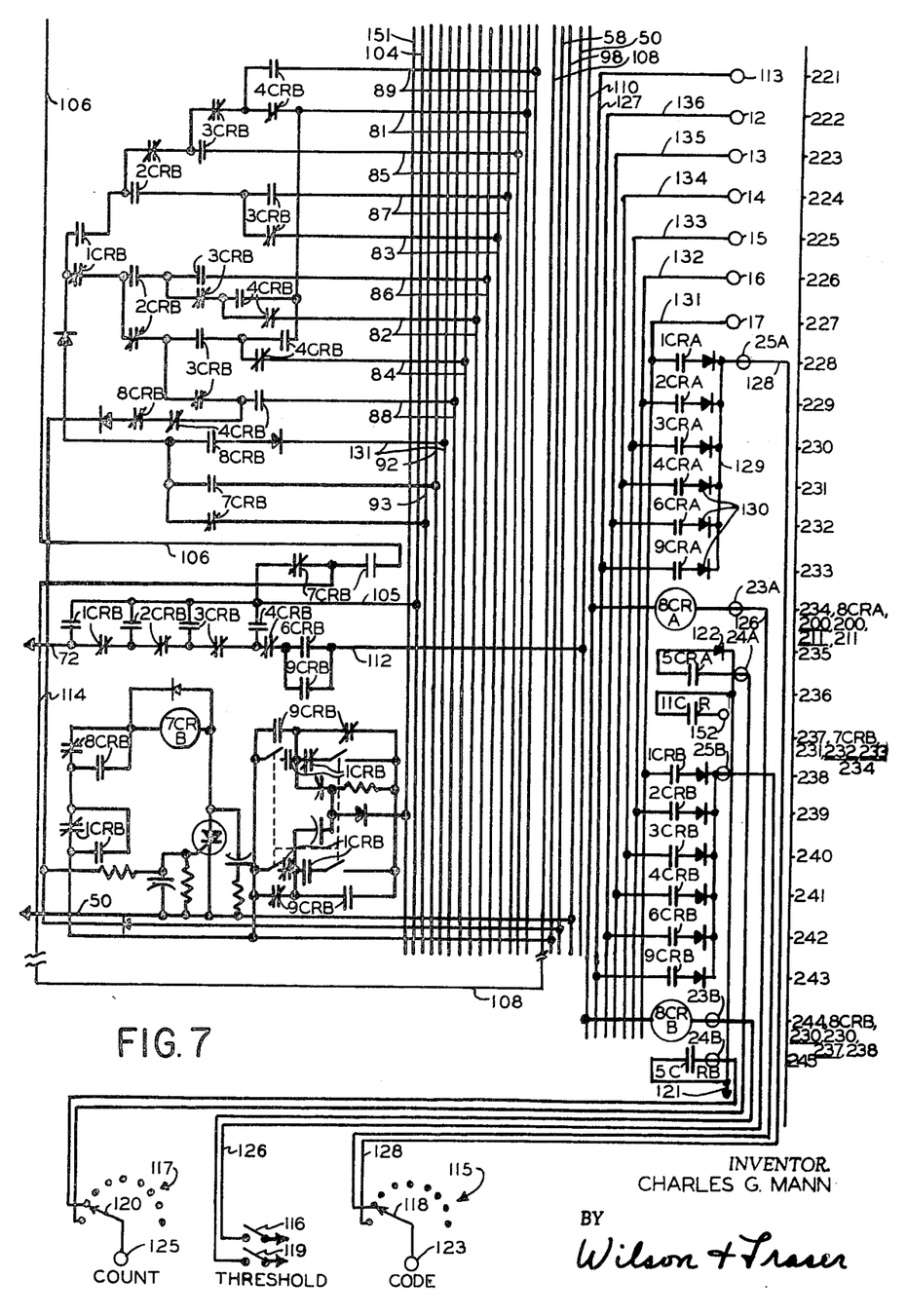
Figure 8:
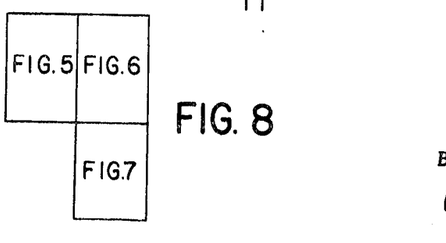
FIG. 8 is a diagram of the orientation of FIGS. 5, 6 and 7 to interrelate the elements shown in those figures in a single system.

Only a portion of the production monitoring system is illustrated. It is to be understood that each of a plurality of work stations, in the manufacturing plant, is provided with a control box, as represented in FIG. 2, including a circuit and associated controls as shown in FIG. 5. Further, these controls and the control box for each work station of a line are combined as represented for stations A and B of a line in FIGS. 6 and 7. In addition, each line of work stations includes a group of controls as shown in FIGS. 5, 6 and 7. The fragmentary circuits, illustrating the invention, have been shown in across-the-line form to facilitate their understanding. The across-the-line tube of representation associates the operating the control elements for convenient understanding of the electrical operations, and does not portray the physical relationship between elements, such as actuating coils and the contacts which they control. Frequently, the contacts controlled by a particular actuating coil are spaced a substantial distance therefrom in the drawings, and no physical connection therebetween is shown. In order to correlate such elements, and to better indicate the location of the components of the system, the diagrams have been divided into horizontal belts or zones which have been numbered and indexed along the right-hand margin. The actuating coils located within each zone have their reference characters reproduced in the marginal index to the right of the line numbers. The line location of the contacts associated with each actuating coil, thus indexed and shown in the illustrated drawings, is set forth to the right of the reference character of the actuating coils by the number of the line, or lines, in which they appear. The type of contact is also designated in this index. Back or normally closed contacts have their line numbers underlined to distinguish them from front or normally opened contacts.

For purposes of convenience, a short functional name of the several relays shown is tabulated below, together with the location of the actuating coil:

| Symbol | Function | Location |
|---|---|---|
| 1CRA | first code relay station A | 161 |
| 2CRA | second code relay station A | 166 |
| 3CRA | third code relay station A | 171 |
| 4CRA | fourth code relay station A | 173 |
| 5CRA | count relay station A | 181 |
| 6CRA | "down" status relay station A | 176 |
| 7CRA | transfer relay station A | 211 |
| 8CRA | threshold relay station A | 234 |
| 9CRA | "run" relay station A | 179 |
| 11CR | line interrupt relay | 207 |

In view of the duplication of certain of the circuits for two work stations, the elements of those circuits having like functions, and particularly relay coils and relay contacts, have been identified with their respective work stations by a letter suffix as "A" for station "A," exemplified by the contact 4CRA at line 191, and "B" as a suffix for station "B," as identified by the corresponding contact 4CRB at line 221.

The present monitoring system facilitates the simultaneous monitoring of work stations in a plant by supervisory personnel and a computer by providing interface equipment between the work station and a central station and computer utilizing common signals. Computer time is conserved by restricting computer inputs during normal operation to a narrow scope of production information, e.g., to the occurrence of a production operation, and in response to a significant change in production conditions, e.g., the transfer of a work station production status between a "down," "run" and "off" state or the call for aid at a work station, the computer broadens its review of conditions at the work station by assimilating a greater amount of information such as production status of the work station, the nature of the call for aid, and logged down time. As a further economy of computer utilization, in large systems including a great number of work stations, the stations can be grouped so that the computer reviews detailed conditions only at the group of stations including the station at which the significant production change occurred.

Economy of computer and central station equipment is also achieved by monitoring work stations in a line orientation corresponding to the interrelationship of their productive operations in the total manufacturing function of the plant. Thus a multiple input to the computer and to the indicators at the central station are based upon a line orientation such that many elements are common to a plurality of work stations in a line. Indicators at the central station and at the work stations are arranged to provide multiple functions. Those at the central station are common to a line of work stations and are arranged to indicate duplicate functions at two or more work stations.

The line orientation of monitoring offers the flexibility of operation of less than all stations in a line. Each work station can be set to either a "run," "down," or an "off" production status. If all stations of a line are either in the "run" or "off" status, those in the "run" status indicate that status, and those in the "off" status indicate an "off" status while the central station indicates the line is in "run" status. If any station of a line is in the "down" status, the central station indicates the line to be "down" and a "down" indicator is active for each station in either the "run" or "down" status. Where lighted indicators are employed, the blinking of the lights is employed for supplementary indications. Call transmitting means are provided at work stations for selectively calling for aid as "foreman," "material handling," "die repair" and the like. A central station annunciator display for each line indicates these calls. The annunciator display can also be made up of lighted panels. Registration of a "help call" at a work station is signified at the work station by blinking the "down" indicator for that station in a regular pattern. This alerts the work station attendant to his registered "help call." Initially, a registered "help call" is indicated at the central station annunciator display as a blinking of the annunciator panel characteristic of the call. When the central station attendant acknowledges the call the annunciator panel is illuminated at a constant level by operation of a reset switch until the transmission from the work station is terminated. A duplication of like calls from two or more work stations is indicated by flashing the line's "down" indicator in conjunction with illumination of the appropriate annunciator panel. Readout of a "help call" by the computer is available under conditions of either flashing or constant illumination.

Annunciator operation at the central station is initiated by a "threshold" signal from the computer when operation of a work station warrants attention by the central station attendant. Thus, the computer can be programmed to sense a failure to meet production standards, or to require a tooling change at the work station and issue a "threshold" signal for that station. Such a signal results in a flashing annunciator panel which when acknowledged remains at a steady illumination until reset by the computer. Duplicate "threshold" signals from several stations of a line cause the lines "down" indicator to blink until acknowledged.

Each transfer of production status for a work station causes a detailed review by the computer. Production status is selectively assigned by a switch which in any transfer either institutes or terminates at least momentarily, the "run" status for the work station. A control responsive to either change of "run" status institutes the detailed consideration of production information for a work station by the computer.

Figure 1:
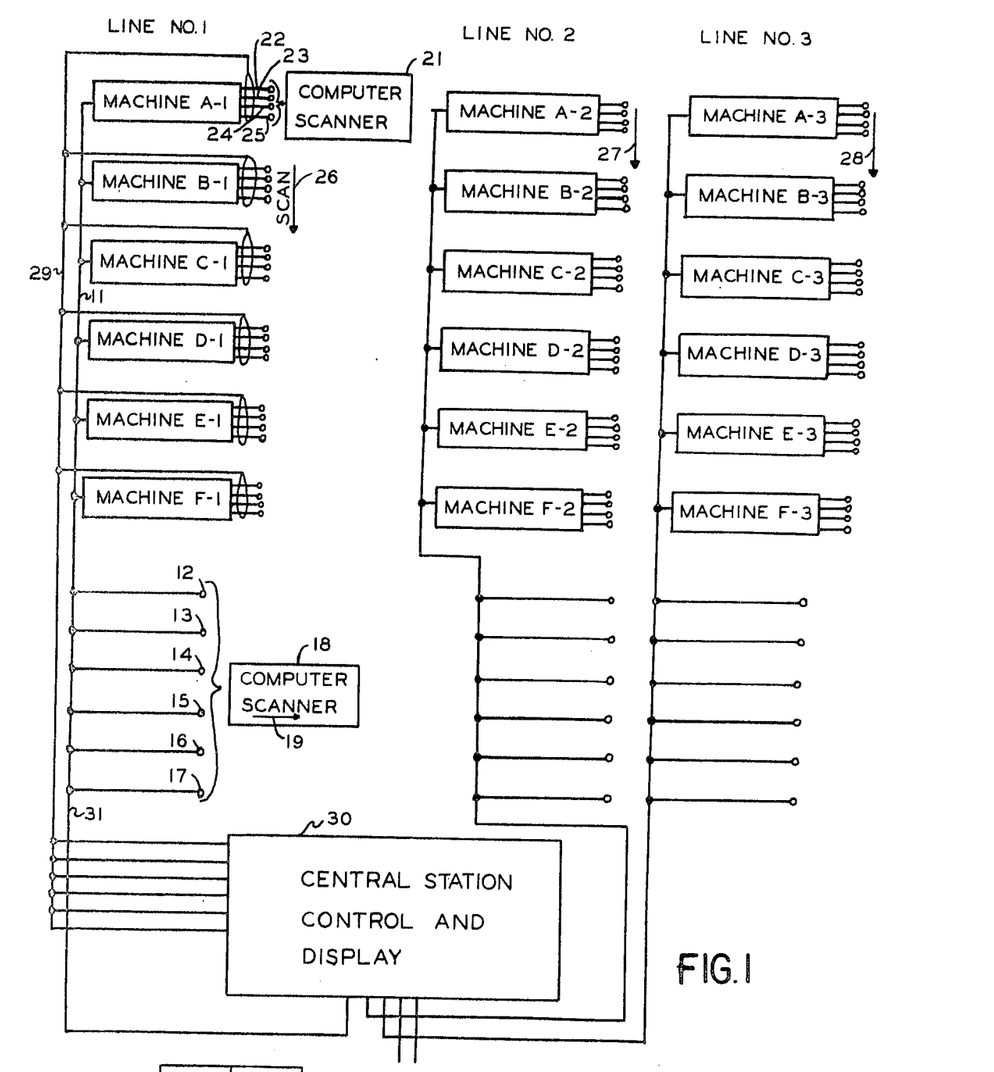
FIG. 1 is a diagram representing a portion of a plant including a plurality of production lines, each including several work stations, a diagrammatically represented central station, and computer scanners for the portion of the system, specifically showing three lines of six work stations each, and including scanning means for a computer to scan regularly certain outputs of each work station, and when appropriate other outputs through common terminals of a line including the individual work stations.

In FIG. 1 three lines of machines or work stations, lines No. 1, No. 2 and No. 3, of a typical group of work stations which may be in a metal stamping plant are represented. Each line includes six machines A to F identified as "Machine A-1 to Machine F-1" for line 1 and arrayed in vertical alignment. A cable 11 connected in parallel to each machine and broken out at terminals 12 through 17 represent the common outputs to be scanned for the line by a selectively actuated computer scanner 18 arranged to scan corresponding common line outputs for lines 2, 3 and other lines of the group. Scanner 18 is represented as advancing horizontally by arrow 19 along the array of common outputs for the several lines.

Computer scanner means 21 for the supervising computer scan the individual work station output arrays as at 22, 23, 24 and 25 of machine A-1. These scan means proceed as indicated by the arrows 26, 27 and 28 to scan the work stations of line No. 1 then line No. 2 and so on.

The signals to the terminals individual to the work stations and to the line terminals are all coupled to a central station control and display 30 as by cables 29 and 31. The combination of functions offered by the system involves assignment of a production status to the individual stations and their line, indications of status for a line at the central station, a means for calling for help at each work station, a display for the "help calls" and status at the central station, and a recording and response to certain conditions by the computer.

Each machine has a conveniently adjacent control box (not shown) having a panel 32 as illustrated in FIG. 2. A "run" indicator 33 and an alarm or "down" indicator 34, advantageously green and red lamps respectively, are displayed on the control panel 32 such that the darkening of both indicates the work station is in the "off" status, the lighting of lamp 33 alone indicates the work station is in the "run" status, the lighting of lamps 33 and 34 indicates the line is "down" and the work station is assigned "run" status, the blinking of alarm 34 either alone or with 33 lighted indicates a "help call" is set for the station, and the lighting of lamp 34 alone indicates the work station is in the "down" status.

Two manually operative controls are contained in the machine control box. A restricted access switch 35, available only to authorized personnel, as by key actuation, has three detent positions, "off," "run," and "down" to assign the production status to the work station. A multiposition tap switch 36 is available to the work station attendant to transmit his calls for "help" to the central station. In the example, 12 positions are shown for switch 36 to provide a "run" signal and up to 11 "help calls." In a stamping plant application, nine typical calls are indicated as labeled in FIG. 2.

Figure 3:
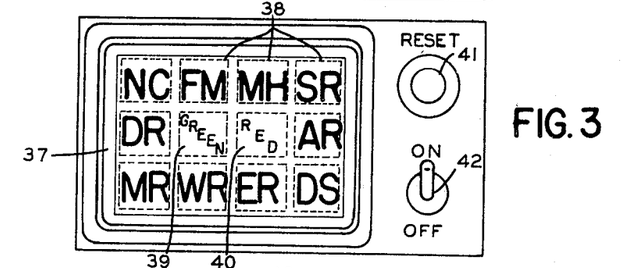
FIG. 3 is a typical central station annunciator display and control section for a line of work stations according to one embodiment of the invention.

The central station has a lamp annunciator display 37 which can either be common to the group of work station lines or can be individual to each work station line as shown in FIG. 3. The display 37 is made up of translucent panels 38 backed by masked lamps and lettered to correspond to the signals developed from switch 36 as well as a "no count" panel NC, and run and alarm panels 39 and 40 corresponding to lamps 33 and 34. A reset switch button 41 for acknowledging signals from a line is located adjacent the line's annunciator as is a "display-standby" switch 42 of the toggle type for enabling and disabling the line from the central station.

Figure 4:
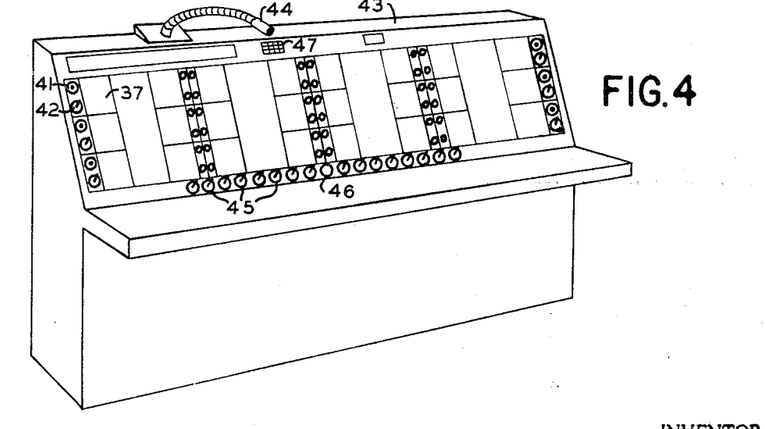
FIG. 4 is a central station display console for mounting a plurality of controls and annunciator panels of the type shown in FIG. 3 for each of a plurality of production lines.

As shown in FIG. 4, the line annunciators 37 for a plurality of lines are mounted on a console 43 which can include auxiliary communication equipment such as a microphone 44, plant paging zone keys 45 for a paging system (not shown), and paging zone indicators 46. Alternatively, an annunciator similar to that of FIG. 3 can be provided as a common element for several lines and the individual line "run" and "down" indicators as 39 and 40 can be positioned with the line control "on-off" switch 42 and a reset button 41. For example, the annunciator can be located at panel 47 and can be activated for any given line by closing that line's reset button 41. This is accomplished by wiring the reset button of each line in parallel with every other line to the annunciator from the output leads for the line.

In the line orientated arrangement of the central station, the setting of any work station switch 36 on other than its "run" position is indicated by a "help call" on display 37 and the blinking illumination of the alarm 40. If all work station switches 35 of a line are on "run," or if no switch 35 of the line is set on "down" and any switch 35 of the line is set on "run," "run" indicator 39 is illuminated. If the switches 35 are all "off" for a line, no lamps are lighted on panel 37 to indicate the line is not running and is unmanned.

When any switch 36 is set on a "help call," the corresponding "help call" panel is illuminated on annunciator 37 for the line and alarm signal 40 flashes to call the central station attendant's attention to the line. A signal indicating a "help call" for the line is also made available to the computer to be utilized when an interrupt signal is generated. The central station attendant acknowledges calls as he responds to them by means of a reset switch having a button 41 adjacent the annunciator 37. When the reset button is pressed, the alarm firms up, that is it is illuminated steadily. The annunciator will respond to overlapping signals from different stations on the line as they are set by switches 36 by causing alarm 40 to flash until it is acknowledged and firmed up. In those cases where the same "help call" is transmitted from two stations and the first registered call has been firmed up, the second call again causes the alarm to flash until the reset button 41 is again operated.

When the key switch 35 is on the "run" condition and no production count has been received from a work station for a specified time period for which the computer is set, the computer lights the annunciator NC panel for a "no count" signal while the run lamp 39 remains lighted.

Transfer of the key switch 35 to the "down" position for any station darkens the "run" lamp 39 for the line and lights the alarm lamp 40. Further, each transfer of the key switch actuates the computer to cause it to record the change of conditions for the line and identify the work station and log "down time," "run time," or "off time."

The control circuits for the indicators at the central and work stations and to provide signals to and respond to signals from the computer are shown in FIGS. 5, 6 and 7.

Control box components for a typical station, as for machine A-1, are shown within the dashed line rectangle 48 of FIG. 5. The attendant's "help call" switch 36 has three decks 36-1, 36-2 and 36-3 to set up coded signals to code relays 1CRA, 2CRA, 3CR and 4CRA. Switch 36 is shown set in the "run" position. Deck 36-1 has five brushes 49-A, -B, -C, -D, and -E connected to common lead 50 from the −24-volt DC power supply at terminal 51 of FIG. 6. Deck 36-2 has two brushes 52-A and -B connected to lead 50. Deck 36-3 has a brush 53 connected to lead 50. Brushes for the decks are coupled by a shaft 54, shown as a dashed line, to move together. As will be explained, each transfer of the setting of switch 36 between significant "help call" positions momentarily energizes relay 1CRA by engaging one of brushes 49 with contact segment 55 or 56 between the 10th and 11th and the 11th and 12th segments of deck 36-1. This alerts the supervisory equipment to any change in "help call" setting.

"Help calls" are established in a binary code through the code relays 1CR to 4CR to establish an energizing path for an appropriate indicator of the annunciator display 37 through a relay contact matrix for the work station. The code relays 1CR and 2CR are energized from a +24-volt DC source at terminal 57 of FIG. 6 through lead 58 such that the setting of the brushes of switch deck 36–1 to the first, third, fifth, seventh and ninth positions engages segment 8 by brushes 49–A, 49–B, 49–C, 49–D and 49–E respectively to energize 1CRA. Relay 2CRA is energized for the second, third, sixth, seventh and 10th positions of switch 36 by engagement of brush 52A with segments 11 and 12, brush 52B with segments 11 and 12, and brush 52A with segment 7 of deck 36–2 respectively.

Code relays 3CRA and 4CRA are connected to lead 59 from a 24 volt AC supply at terminal 60 of FIG. 6. Relay 3CRA is selectively energized from decks 36–2 and 36–3 setting switch 36 to the fourth through seventh and 11th positions to complete circuits from lead 50 brush 53 to the fourth, fifth and sixth segments of deck 36–3 to lead 61, and from lead 50 to segment 4 of deck 36–2 from brush 52A and 52B respectively. Rectifiers 62 polarize this circuit and relay 3CRA to the AC on lead 59. Relay 4CRA is polarized to the AC on lead 59 by rectifiers 63 so that it responds to engagement of brush 53 with segments 8 through 11 of deck 36–3 when switch 36 is set to the eighth through 11th positions.

Key switch 35 is provided with three detent positions, "off," "run" and "down." It is shown in FIG. 5 in the "off" position. In the "run" position its brushes 64–A and 64–B engage segments 3 and 10 respectively. Brush 64–A completes a circuit from the common lead 50 through polarizing rectifiers 65 to "run" relay 9CR, thence to lead 66 and if switch 42 is closed, through switch 42 to lead 59 and the 24-volt AC supply. Brush 64–B energizes run lamp 33 from lead 50 to lead 67, lamp 33, resistance 68, lead 69, lead 70 a parallel family of 9CR relay contacts and a series family of 6CR relay contacts, lead 58 and the positive 24-volt DC source at terminal 57.

In the "down" position of key switch 35 brush 64–A engages segment 6 to complete a circuit between leads 50 and 66 through polarizing rectifiers 71 and "down" relay 6CRA. In the line orientation of work stations the setting of any station to a "down" status causes all stations in the line to indicate a "down" status by lighting their lamp 34 through energization of lead 72 as will be described with reference to FIG. 6. This line orientation is also arranged to enable the "down" and "run" relays of all stations in the line from the common "display-standby" switch 42 at the central station. The switch 42 couples lead 73 to lead 59 from the 24-volt AC source to supply lead 66 of each work station circuit in the line.

Each work station has a count device 74 electromechanical, photoelectric, or inductive which may be in the form of a switch actuated by press crosshead motion, for example. The closure of the circuit of count device 74 couples lead 50 through lead 75 to lead 76 and "count" relay 5CRA provided key switch 35 is not set in its "off" position. Thus if the work station is set for either its "run" or "down" status, contact 9CRA at 183 or 6CRA at 182 are closed to provide a circuit to lead 58 and energize relay 5CRA for a production count. Count device 74 also causes run lamp 33 to change its level of illumination by partially shunting lamp 33 through resistor 77 and blocking diode 78.

Each work station of a line has a circuit as shown in FIG. 5 differing from that circuit only in regard to switch 42. Only one switch 42 is provided per line.

The interrelated line supervisory controls and a typical individual station control as it relates thereto is shown in FIG. 6. A code relay matrix for a typical work station is shown from 191 to 199 in FIG. 6 and is multiplied with similar matrixes as at 221 to 229 through leads 81 through 89 for the annunciator lamps 38 of display 37 for the line. The "run" indicator 39 of the line is at 201 and the "alarm" indicator 40 is at 202 while the reset switch 41 is at 208. These common elements will be considered for a single station.

Setting switch 36 of FIGS. 2 and 5 provides an energizing path for an appropriate indicator lamp 38 in the central station line annunciator display 37 between the common lead 50 and 9-volt AC source applied at the terminal 90 or 91 for the 9 volt AC continuous source or the 9-volt AC intermittent source respectively. Selection of the continuous or intermittent source to provide either solid or blinking illumination of a lamp 38 in annunciator 37 is through work station indicator transfer relay 7CRA at 211 by means of its front contact at 203 and its back contact at 204 from leads 92 to terminal 90 and 93 to terminal 91 respectively. Leads 92 and 93 provide connections to corresponding 7CR relay contacts for the other work stations of the line as 7CRB at 231 and 232.

Power is fed to the code relay contact matrix at leads 94 and 95 and to the lamps in the following code for settings of switch 36:

| Switch setting | Energized code relays | Energized lead | Trouble call | Annunciator symbol |
| --- | --- | --- | --- | --- |
| 1 | 1CR | 81 | Foreman | FM |
| 2 | 2CR | 82 | Material handling | MH |
| 3 | 1CR, 2CR | 83 | Steel rejects | SR |
| 4 | 3CR | 84 | Die repair | DR |
| 5 | 1CR, 3CR | 85 | Automation repair | AR |
| 6 | 2CR, 3CR | 86 | Machine repair | MR |
| 7 | 1CR, 2CR, 3CR | 87 | Welder repair | WR |
| 8 | 4CR | 88 | Electrical repair | ER |
| 9 | 1CR, 4CR | 89 | Die set up | DS |
| 10 | 2CR, 4CR | 81 | Foreman | FM |
| 11 | 3CR, 4CR | 81 | do | FM |
| 12 | | | | NONE |

Each change of switch 36 at a work station causes the "down" lamp 34 at its control box to blink and the "alarm" lamp, and "help call" panel in the central station annunciator array for its line to blink for the message of the call. As noted, each shift of switch 36 between message positions causes the momentary energization of relay 1CRA by closure of a circuit to auxiliary segment 55 or 56. Relay 1CRA opens its back contact at 213 and thereafter closes its front contact at 214 to interrupt the supply to relay 7CRA at 211 and to controlled rectifier 96 an interval sufficient for conduction therein to decay below a sustaining level. Rectifier 96, which can be an SCR, thereby interrupts the circuit energizing relay 7CRA causing the relay to drop out and open its front contact at 203 and closing its back contact at 204 to transfer the lead 94 from the solid source coupled to terminal 90 to the blinking source coupled to terminal 91.

As "help call" switch 36 for station "A" is set to a message such as "die repair" on panel 32 shown in FIG. 2, relay 7CRA is dropped and brush 53 engages segment 4 of deck 36–3 to energize relay 3CRA in FIG. 5. Relay 3CRA opens its back contacts at 192, 195, 196 and 199, and closes its contacts at 193 and 194, with no effect in view of open contact 1CRA at 195, closes contact 3CRA at 196 with no effect in view of open contact 2CRA at 196, and closes contact 3CRA at 198 to blink "die repair" indicator by a circuit from terminal 91, lead 93, back contact 7CRA at 204, leads 94 and 95, back contacts 1CRA at 196 and 2CRA at 198, front contact 3CRA at 198 and back contact 4CRA at 198 to lead 84, DR lamp 38 and common lead 50. At this time "alarm" lamp 40 and down lamp 34 at the work station also blink since contact 7CRA at 207 closes and back contact 7CRA at 206 opens.

Lamp 40 has a blink circuit established from the +24 volt blink source (not shown) coupled to terminal 103 at 206, lead 104 front contact 7CRB at 233 of FIG. 7, lead 114 through any succeeding 7CR relay front contacts connected in the manner of 7CRB contacts at 233 and thence to lead 108, resistance 109 and lamp 40 to common lead 50. If another unacknowledged "help call" is registered at another station so that its 7CR relay is deenergized as for example 7CRB for station "B," the blink circuit is established from lead 104 through the back contact of that relay as 7CRB at 233 to lead 114.

Lamp 34 at the work station having the "help call" set is blinked from the source connected to terminal 103 through leads 104 and 105 to the code relay contacts as at 208 for station A, lead 72 to lamp 34, and lead 50 in FIG. 5. Thus for the example the blink signal is passed from lead 105 to lead 72 through closed front contact 3CRA at 208 and back contacts 2CRA at 209 prevents any feed of the blink signal to lead 110.

The lamp 38 of annunciator display 37 corresponding to the switch 36 setting blinks until the call is acknowledged by an attendant at the central station through operation of the reset switch 41 for the line. Closure of switch 41 at 208 completes a circuit from terminal 90, lead 92, lead 97, switch 41, lead 98, blocking rectifier 99 and the circuit for the control electrode 100 of controlled rectifier 96. This causes the rectifier 96 to enter conduction and energizes relay 7CRA so it remains energized until its circuit is again interrupted from lead 58 through either contacts of 1CRA at 213 and 214 or of 8CRA at 211 and 212.

Reset of relay 7CRA to the energized condition is also accomplished automatically by a signal from the code relay contact matrix when the switch 36 at the control box is returned to its "run" setting provided relay 8CRA is not energized. With all code relays dropped for the "run" setting, the resetting signal is passed from lead 95 through closed back contacts 1CRA at 196, 2CRA at 197, 3CRA at 199, and 4CRA and 8CRA at 199 to blocking diode 101, lead 102 and the circuit of control electrode 100 for controlled rectifier 96.

With relay 7CR for a work station reset to an energized state, circuits are established for the work station lamp 34 which is independent of those for central station lamp 40. Lamp 34 can be illuminated only to indicate a "down" status for the station. The annunciator lamps 38 are lighted at a constant level from terminal 90, lead 92, contact 7CRA at 203, for station "A," and leads 94 and 95 to the code relay contact matrix. "Down" lamp 40 is constantly lit from terminal 57 when a station is on "down status," through lead 58, contact 6CRA at 209 for station "A," lead 110, contact 7CRA at 207, lead 106, the series of 7CR front contacts for the other stations as 7CRB at 233 for station "B," lead 114 and 108 to resistance 109 and lamp 40.

A second "help call" from another work station can be registered while a first "help call" is maintained. The setting of the second station's switch 36 to a call energizes a code relay for that station to connect its lead 72 to its lead 105 to blink its down lamp 34. The drop of relay 7CRB in the case of a call from station "B" closes back contact 7CRB at 233 to couple leads 105 and 114 to blink alarm 40. The second station's relay matrix passes the blink signal on lead 93 through back contact 7CRB at 232 to its code relay contact matrix and to the lead 81 to 89 of the appropriate signal to cause the annunciator of that signal to blink. If the signal for the second station differs from that of the first station, the blinking annunciator is displayed with the steady annunciator of the first call and is therefore readily identified by the central station attendant. If the second call is the same as the first, the annunciator will have a constant illumination level and the alarm 40 will blink. Since an acknowledgement of a signal darkens alarm 40, and since only one annunciator is lighted, the central station attendant is informed by the blinking alarm 40 that a second station in the line has a "help call" duplicating one previously acknowledged.

Steady illumination of down lamp 34 occurs for each station in the line which is not "off" and which has no code relay energized in response to the setting of any station in the line on "down" status by its key switch 35. If station "A" is set to down time, a circuit from the −24-volt line 50 through key switch 35 to position 6 energizes down relay 6CRA at 176. Relay 6CRA closes contacts at 209 to pass current from lead 58 to lead 110 through contact 6CRA at 209 to lead 111 and thence through closed back contacts 4CRA, 3CRA, 2CRA, and 1CRA at 209 to lead 72 and "down" lamp 34 to lead 50. If no station of the line has its 7CR relay dropped contact 7CR as at 207 will pass a signal to lead 106, through the chain of closed 7CR contacts for each station to lead 108 and alarm lamp 40 at the central station. Any other station of the line set for "down" status also has its "down" lamp 34 lighted by its connection to lead as through lead 112 for station B at 235 and its 6CRB contact in series with its code relay contacts while its lamp 34 is lighted through contact 9CRB at 236, the code relay contacts at 235 if its switch 36 is set for "run" status.

The computer aspects of the monitoring system as diagrammatically represented in FIG. 1 involve continuously monitoring selected outputs for the production count for each station and for issuing a threshold signal to the station when its production fails to meet standards. Further, when indicated to be desirable, as when a change occurs in the status of a work station, the computer scans the lines to ascertain the line containing the changed work station and then scans the work stations of the line to ascertain their production status and any "help calls" which may be registered. In this monitoring process the lines are scanned as represented by scanner 18 of FIG. 1 and the stations of each line are scanned while scanner 18 is coupled to the line by the scanners 21. In order to efficiently utilize computer time, a detailed consideration of production conditions is undertaken only when a significant change occurs at a station or a consideration is programed as at the end of a shift. In one installation of 720 work stations computer usage was reduced by grouping the stations into 10 groups of 72 and subdividing the groups into 12 lines of six stations each. A line scanner 18 was provided for each group so the computer had 10 such scanners to scan terminals 12 to 17 of FIGS. 1 and 7. In this manner a change in production conditions at a work station initiated a scan by its scanner 18 only, hence only the group of stations in which the change occurred was scanned.

The scanned terminals for stations A and B of line 1 as scanned by scanners 21 are shown in FIG. 7 for "help calls," and production status at terminals 25A and 25B respectively, and for production count terminals 24A and 24B respectively. The "threshold" signals from the computer are applied through individual switches such as 116 and 117 in the computer coupled to the station terminals such as 23A and 23B respectively. The scan devices in FIG. 7 are represented as two banks of contacts 115 and 117 over which two brushes 118 and 120 scan to feed computer terminals 123 and 135 for "help calls" and production status, and production count respectively.

Production count is scanned at a rate such that two scans will be completed in the shortest interval a count relay 5CR is pulled in in response to operation of its count device 74. One utilization wherein the equipment being monitored had at least 100 milliseconds of off time was arranged with 100 milliseconds of delay in the drop out of relay 5CR for counting productive operations. In this system the computer scanned production at each station once every 200 milliseconds and was arranged to store a production count each time it sensed two "on" scans following two "off" scans at a terminal such as 24A for station "A" (by means not shown). In this manner the computer disregards spurious signals which otherwise would be accepted as false counts. These signals are made available to the computer at bank 117 through brush 120 to terminal 125 and are developed by the closure of contact 5CRA at 235 to complete a circuit from common lead 121 through blocking diode 122, contact 5CRA and terminal 24A to the first contact of bank 117.

In the event the rate of production counts for a work station is below the level considered acceptable for that station, below its production "threshold," the computer during the scan of the station issues a signal between common terminal 113 and the computer switches individual to the work stations as 116 and 119. Such signals are passed for station "A" when the computer closes switch 116, to lead 126, terminal 23A, relay 8CRA at 234, lead 127 and terminal 113. Relay 8CRA is thereby energized to activate a "no count" indicator in the annunciator display 37 for the line. As described, 8CRA opens its back contact at 211 and thereafter closes its front contact at 212 to interrupt the circuit of relay 7CRA and controlled rectifier 96 an interval sufficient to terminate conduction and cause relay 7CRA to drop. This transfers the annunciator display for station "A" to a blinking condition at back contact 7CRA at 204. Closed contact 8CRA at 200 to lead 131 completes the circuit through lamp NC of the annunciator display to common lead 50. This blinking signal is acknowledged by the central station attendant through reset switch 41 to turn on controlled rectifier 96 and firm up the blinking signal.

In the event the count from the work station achieves the threshold level, relay 8CRA is deenergized by the computer. Alternatively, relay 8CRA can be dropped by the computer after a suitable interval (by means not shown). This darkens lamp NC by opening contact 8CRA at 200 and resets the transfer relay 7CRA to remove the signal. The reset signal is passed to lead 102 by the closure of back contact 8CRA at 199.

The "help calls" and production status signals are identified in the computer by the scanned line output terminals 14 to 17 and 12 and 13 respectively, which selectively actuated scanner 18 engages throughout the scan of the individual station's output by scanner 115. While the scanner 115 is considering station "A" it applies a power supply from the computer at terminal 123 to lead 128 and terminal 25 to lead 129, blocking rectifiers 130 and any of the contacts which may be closed of the code relays 1CRA to 4CRA, the down relay 6CRA and run relay 9CRA at 228 to 233. Each relay contact is connected to a lead connected in multiple to the corresponding relay contact of every other work station in the line and to a line terminal to which the computer is coupled for readout by scanner 18. The code relay conditions for 1CR are applied to lead 131 and terminal 17 for 2CR are applied to 132 and terminal 16, and for 3CR and 4CR are applied to leads 133 and 134 and terminals 15 and 14. Thus during the scan of station "A" the signals on leads 131 to 134 represent the "help calls," if any, for station "A," and similarly for station "B" during its scan. A "down" status of a scanned station is indicated by a closed 6CR contact, as 6CRA at 232 for station "A," to apply a signal to multipled lead 135 and to the per line terminal 14 to the computer while a "run" status is signaled on lead 136 from a closed contact 9CR to terminal 12.

Each change in status of a station involves operation of key switch 35 between a "run" setting and either a "down" or an "off" setting. Since each such change is significant to the overall operation of the plant, it is specifically monitored by the monitoring equipment. An interrupt relay 11CR at 207 is provided for each line and arranged to be energized in response to the change of production status of any work station in the line. When energized, relay 11CR causes the computer to scan the lines of its group, and identify the changed line and work station, and record the information available for that changed line and work station together with other information such as the time.

Relay 11CR is energized by dumping the change on a capacitance into its coil. Transfers from a "run" status for a station dumps capacitance 147 while transfer to the "run" status dumps capacitance 148. With switch 35 for station "A" transferred from "run" to either the "off" or "down" setting relay 9CRA is dropped out and back contacts 9CRA at 215 and 211 are closed while front contacts 9CRA at 215 and 211 are open. This provides a charging path for capacitance 147 from terminal 57, lead 58, lead 149, back contact 9CRA at 215, capacitance 147, blocking diode 150, lead 151, and relay 11CR, to common lead 50. The initial surge of current pulls in relay 11CR briefly to close contact 11CR at 236 and apply an interrupt signal from lead 121 to terminal 152 to the computer to initiate its scan by scanner 18 for the group. During this transfer the closure of back contact 9CRA at 211 permits the discharge of capacitance 148 through resistance 154. Upon transfer of switch 35 to the "run" setting relay 9CRA closes its front contacts at 211 and 215 and opens its back contacts at 211 and 215, whereby the discharge path for capacitance 148 is opened and the charge path from lead 149 is closed to apply current from 148 through diode 150 and lead 151 to relay 11CR. At this time, capacitance 147 is discharged through closed contact 9CRA at 215 and resistance 154 and its charge circuit is open at back contact 9CRA at 215.

A scan of the lines can also be instituted by a change of setting at the "help call" switch 36 for any station if gang switch 153 is closed at its contacts at 212 and 214 for station "A," whereby contacts of 1CRA are paralleled with contacts of 9CRA in the charging and discharging circuits for capacitors 147 and 148.

On occasion it is desirable to treat a line of production stations as in the "run" status where less than all stations of the line are set to "run." However, the converse does not follow. That is, when any station in a line is set "down" this presumes that the station should be running, since it is not set "off," and for some reason is not on "run" status. Thus, the indicators at the central station for the line are arranged to indicate a "run" condition if no station is set for "down," i.e., if all stations are set for either "run" or "off," and if at least one station is set to "run." In addition, if any one station is set for "down," the "down" indicator lamp at each work station set for "run" or "down," i.e., not "off," is lighted while the central station "run" indicator is dark.

"Run" indicator 39 at the central station and "run" lamp 33 at the work station are illuminated through a circuit from terminal 57 at 217, lead 58, the series of back contacts for the "down" relays 6CRA through 6CRF for stations "A" through "F" at 209 to 215 (all of which are closed if no station is in "down" status), to lead 155, through one or more of the "run" relay contacts 9CRA through 9CRF for stations "A" through "F" at 210 to 215 (each of which is closed if its station is in "run" status), to leads 70 and 69 and thence to lamp 33 of FIG. 5. If the key switch 35 of any work station of the line is set on "run," the line "run" indicator 39 is energized from common lead 50 through resistor 156. If no station is set to the "run" status, the circuit is open between leads 70 and 155 and the "run" lamp 33, and "run" indicator 39 remains dark.

The "down" lamp 34 at each work station is responsive to any station of its line being set to the "down" status even though the station is on "run" status. Thus if station "B" were "down" to close contact 6CRB at 210 the +24-volt DC supply from lead 58 would be to leads 110 and 112 so that every station in "run" status would have a circuit through contact 9CRA at 209 to lead 111, and every station in "down" status would have a circuit to lead 111 through contact 6CRA at 210. The station's "down" lamp is not lighted if it has an energized code relay as where a "help call" has been set to open one or more of the series of code relay back contacts 1CRA to 4CRA at 209.

The indicator 40 at the central station is continuously lighted as a "down" indicator if any work station is set to "down" status through a circuit from energized lead 110 contact 7CRA at 207 lead 106, contact 7CRB at 233 lead 114 and so forth through each station's 7CR contact to lead 108, resistance 109 and indicator 40. The operation of any station's transfer relay 7CR will interrupt this circuit to permit indicator 40 to blink as an alarm in conjunction with a lighted annunciator lamp.

Thus, a station set to "run" status displays a "run" indicator as does its central station line signal display. If any station of a line is set to "down" status the "down" line indicator at the central station and all work stations set for either "run" or "down" status display a "down" indicator.

Productive operations at a work station are sensed and actuate an indicator as by flashing the "run" indicator for that station.

Help signals can be transmitted from each work station to the central station. Such calls attract the central station attendant as blinking annunciator lamps common to all stations of the line. Central station attendants are reminded that the "help call" requires response until they consciously acknowledge the call by operating a reset switch which terminates the blinking and causes the annunciator signal to be constantly illuminated thereby retaining the acknowledged call record. Additional "help calls" from other stations of the line can be displayed on the annunciator. When the new call differs from that being displayed on the annunciator, the display is retained and an appropriate indicator is blinked until acknowledged through the reset button. When the new call corresponds to that being displayed, the central station attendant is alerted by a flashing of the line "down" indicator as an alarm lamp until the call is acknowledged through reset button operation.

The indicator functions are correlated with the production of signals available to a computer, and the computer is placed in operation for a detailed consideration of these signals when a significant change occurs in the production conditions for a work station in the group upon which the computer operates. The system thereby provides an interface between the work stations and the plant supervision which is available to both supervisory personnel and a supervising computer. Line orientation of the work stations maximizes the utilization of this equipment at the interface while presenting a logical portrayal of production conditions for the plant.

It is to be understood that the above disclosure is presented as illustrative of the present invention and is not to be read in a limiting sense.

I claim:

1. A production monitoring system including a work station; first means issuing a production count for each occurrence of a given production function at said work station; a computer operatively coupled on a regular cycle to said first means and programed to issue production data in response to said production count, manually operated signal means at said work station selectively operable to issue any "help call" of a plurality of "help calls" from said work station to said central station; manually operated production status means for transferring the production status assigned to said work station; and means automatically responsive upon the operation of said manually operated means for said work station to apply production information to said computer of a scope broader than said production count issued by said first means and including any "help call" selected by operation of said signal means and any production status assigned by operation of said production status means.

2. A production monitoring system including a plurality of work stations; a production count device at each of a plurality of said work stations; a computer programed to issue production information and response to predetermined production conditions at said work stations; and a scanning means for repetitively coupling each of said production count devices to feed information to said computer, said scanning means having a scan frequency to scan any actuated production count device at least twice during a count operation of said device and said computer being responsive only to at least two successive scans of count operation for any count device.

3. A production monitoring system comprising a plurality of work stations related to each other in a line work product relationship; assignment transferring means for each of a plurality of said work stations for transferring assignment of said work station between a "run" and a "down" status; a central station for said line of work stations; a production indicator for said line at said central station; and means to actuate said production indicator to a "run" status in response to at least one work station of said line having a "run" production status and no work station of said line having a "down" production status.

4. A combination according to claim 3 wherein said assignment transferring means has an "off" status whereby said actuator means is not affected by the assignment of work status to an "off" status.

5. A combination according to claim 3 including an indicator at each of a plurality of said work stations; means actuating said indicator to indicate a "down" status for all stations of said line having said assignment transferring means set to a "run" or to a "down" status in response to any station of said line having said assignment transferring means set to a "down" status.

6. A combination according to claim 10 including means for each of a plurality of said work stations of said line adapted to be selectively set to any of a plurality of significant messages for issuing a "help call" for said station; and help call indicators at said central station common to each of a plurality of said work stations of said line for each of said messages.

7. A combination according to claim 6 including an indicator at each of a plurality of said work stations; means responsive to any station of said line having said assignment transferring means set to a "down" status for actuating said indicator at each of said work stations of said line having said assignment transferring means set to a "down" or "run" status to a "down" status indication; and means to actuate said indicator for a work station to a state characteristic of a "help call" when said means for setting a "help call" for said station is in each of a plurality of settings.

8. A combination according to claim 6 including means responsive to a transfer of setting of said "help call" issuing means for actuating said indicators for said "help call" to a first mode of operation characteristic of a call which has not been acknowledged; and means at said central station for transferring said actuated indicators for said "help call" to a second mode of operation characteristic of a call which has been acknowledged.

9. A combination according to claim 8 wherein said "help call" indicators are illuminated, said first mode of operation is a varying brilliance of illumination and said second mode of operation is a steady illumination.

10. A combination according to claim 6 including means responsive to a transfer of setting of said "help call" issuing means for one station of said line to a "help call" corresponding to that set for another station of said line to actuate said production indicator at said central station to a condition characteristic of a duplicated and unacknowledged "help call;" and means at said central station for deactivating said actuated production indicator in response to acknowledgement of said second call.

11. A combination according to claim 10 wherein said "help call" indicators are illuminated, said production indicator is illuminated at a constant level to indicate a production status, and said production indicator is illuminated at a varying level to indicate a duplicated and unacknowledged "help call."

12. A combination according to claim 3 including a computer programmed to issue production information in response to predetermined conditions at said work stations, and means to institute the issuance of information from said line to said computer in response to the transfer of a work station between a "run" status and another production status.

13. A combination according to claim 12 wherein said actuated computer is responsive to said means to actuate said production indicator.

14. A combination according to claim 3 including means for each of a plurality of said work stations of said line adapted to be set to any of a plurality of significant messages for issuing a "help call" for said station; a computer programmed to issue production information in response to predetermined conditions at said work stations; and means to institute the issuance of information from said line to said computer in response to the transfer of the setting of said "help call" issuing means.

15. A combination according to claim 3 including a computer programmed to issue a "threshold" signal in response to predetermined conditions at one of said work stations; means responsive to said "threshold" signal for a work station to actuate said production status indicator for said line at said central station to a "threshold" indication.

16. A combination according to claim 15 including a production status indicator at said work station; and means responsive to said "threshold" signal for a work station to actuate said production status indicator at said work station to a "threshold" indication.

17. A production monitoring system including a plurality of work stations; a central station; means at each of a plurality of said work stations for selectively transmitting any of a plurality of "help calls" to said central station; means at said central station to visually display each of a plurality of "help calls" in response to said transmitting means, said central station visual display means being common to said plurality of "help call" transmitting means and selectively and simultaneously responsive to said "help call" transmitting means from said work stations; an alarm at said central station, said alarm including an auxiliary indicator actuated when a "help call" is imposed from one transmitting means which duplicates the "help call" from another transmitting means; and means responsive to a transfer between "help calls" on said transmitting means to actuate said alarm and said visual display.

18. A production monitoring system comprising: a plurality of work stations; a plurality of groups of said work stations; a plurality of lines of said work stations within each group each line including a plurality of said work stations from each of which line related work product is derived; means for each of a plurality of work stations of a line to generate a production signal for each of a given productive operation at said work station; means at each of a plurality of said work stations of a line adapted to be set to any of a plurality of significant messages for issuing a "help call" for said station; means at each of a plurality of said work stations of a line for transferring assignment of said station between an "off," a "run" and a "down" production status; indicator means at each of a plurality of work stations of a line to indicate the production status of said station; means to operate said indicator means at each of a plurality of work stations of a line in a distinct and characteristic mode responsive to the setting of said " help call" issuing means for said station to certain settings; means to operate said indicator means at each of said stations of a line having said indicator means to indicate a "down" production status when any one station of said line has said transfer means on a "down" production status; a central station; indicators for the production status of a line at said central station; means responsive to at least one work station of a line having a "run" production status and no work station of said line having a "down" production status for actuating to a "run" status said central station production status indicators for said line and said work station production status indicators of each of said stations set to a "run" status; indicators for the "help calls" from the stations of a line for said line at said central station; alarm means for actuating an indicator at said central station in a manner characteristic of a "help call" which has not be acknowledged from said central station; means at said central station for resetting said alarm means; a computer for issuing information pertinent to said plurality of work stations; means for scanning said production signal generators of each work station at a rate which scans each generator at least twice during each production responsive operation of said generator, said computer being responsive to a production operation indication only in response to the absence of a production indication followed by a production indication in at least two successive scans of a generator for a work station; means to alter the operation mode of a work station indicator in a manner characteristic of a production operation in response to a production operation signal for said work station; means for issuing a "threshold" signal for each of a plurality of work stations from said computer in response to a "threshold" condition related to production signals from said work stations; means for actuating an alarm indicator at said central station in response to said "threshold" signal from said computer; second means for scanning the production status and "help call" for each station of each like of a group of work stations in response to a change in production status of one of said work stations; and means for transmitting said information from said second scanning means to said computer.

19. A production monitoring system including a plurality of work stations; a plurality of groups of said work stations; each group comprising a plurality of work stations having a production line relationship; first means for each plurality of said stations for issuing a production count for each occurrence of a given production function at said work station; second means for each of a plurality of said stations for issuing production data of a broader scope than said production count; a computer operatively coupled on a regular cycle to said first means for each of a plurality of said stations, said computer being programmed to issue production data in response to the production count from said first means; production status assignment means controlled by manually operated means for each of a plurality of said stations for transferring the production status assigned to said station; and means automatically responsive upon the transfer of status by operation of said manually operated means for a work station to apply production information for each station of said group including said station of a scope broader than said production count from said second means to said computer.

* * * * *